(12) United States Patent
Hashizume et al.

(10) Patent No.: US 7,343,613 B2
(45) Date of Patent: Mar. 11, 2008

(54) DISC CARTRIDGE HAVING DISC ACCESS OPENING

(75) Inventors: Kenji Hashizume, Tokyo (JP); Morimasa Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 392 days.

(21) Appl. No.: 11/119,892

(22) Filed: May 3, 2005

(65) Prior Publication Data
US 2005/0251818 A1 Nov. 10, 2005

(30) Foreign Application Priority Data
May 7, 2004 (JP) .............................. 2004-138073

(51) Int. Cl.
*G11B 23/03* (2006.01)
(52) U.S. Cl. .................... 720/739; 720/741; 360/133
(58) Field of Classification Search ........ 720/738–743; 360/133
See application file for complete search history.

(56) References Cited

U.S. PATENT DOCUMENTS

| | | | |
|---|---|---|---|
| 4,724,962 A * | 2/1988 | Watanabe et al. ........... | 360/133 |
| 6,356,527 B1 * | 3/2002 | Shiomi et al. ............... | 720/738 |
| 6,728,199 B2 * | 4/2004 | Obata et al. ................ | 720/738 |
| 7,114,166 B2 * | 9/2006 | Hashizume et al. ........ | 720/738 |
| 7,281,258 B2 * | 10/2007 | Hashizume et al. ........ | 720/739 |
| 2002/0012316 A1 * | 1/2002 | Inoue et al. ................. | 369/291 |
| 2002/0131361 A1 * | 9/2002 | Oishi et al. ................. | 369/291 |
| 2004/0114276 A1 * | 6/2004 | Inoue et al. ................. | 360/133 |
| 2004/0257705 A1 * | 12/2004 | Abe et al. .................... | 360/133 |
| 2005/0081233 A1 * | 4/2005 | Kato et al. ................... | 720/739 |
| 2006/0026624 A1 * | 2/2006 | Hashizume et al. ........ | 720/739 |

FOREIGN PATENT DOCUMENTS

| | | |
|---|---|---|
| JP | 2001-283555 | 10/2001 |
| JP | 2003-123426 | 4/2003 |
| JP | 2004-253101 | 9/2004 |

OTHER PUBLICATIONS

English language Abstract of JP 2003-123426.
English language computer-generated translation of JP 2003-123426, Apr. 25, 2003.

* cited by examiner

*Primary Examiner*—Brian E. Miller
(74) *Attorney, Agent, or Firm*—Greenblum & Bernstein, P.L.C.

(57) ABSTRACT

A disc cartridge is constructed so that disc access to a recording medium enclosed within the disc cartridge via an opening in the cartridge case is restricted by a disc tray and a shutter member disposed inside the cartridge case. The shutter member is rotatably attached to one of the disc tray and the cartridge case, and detachment of the shutter member is restricted at least in a range of rotation of the shutter member between a position where the shutter member covers part of the opening and a position where the shutter member has been withdrawn from the opening. Attachment of the shutter member is carried out without crimping.

4 Claims, 14 Drawing Sheets

DISC CARTRIDGE HAVING DISC ACCESS OPENING

BACKGROUND OF THE INVENTION

1. Field of the Invention

The present invention relates to a disc cartridge constructed so that disc access to a disc-shaped recording medium enclosed inside a cartridge main body is possible via a disc access opening.

2. Description of the Related Art

As one example of this type of disc cartridge, a disc cartridge where an information recording medium is enclosed inside a cartridge case is disclosed in Japanese Laid-Open Patent Publication No. 2003-123426. This disc cartridge includes a disc-like information recording medium, a cartridge case including an upper shell and a lower shell, an inner shell that functions as a disc tray, and a pair of shutter members (shutters) disposed between the inner shell and the lower shell. An opening for disc access to the enclosed information recording medium is formed in the lower shell, which is attached to the upper shell. A disc access opening is formed in the inner shell with the same shape and size as the opening of the lower shell, and the inner shell is rotatably enclosed inside the cartridge case so as to be sandwiched between the upper shell and the lower shell. By doing so, when the disc cartridge is loaded into and ejected from a recording/reproduction apparatus, the recording/reproduction apparatus rotates the inner shell with respect to the cartridge case so that part of the opening in the lower shell is opened and closed by the inner shell. In addition, a pair of support shafts for supporting the shutter members are provided so as to protrude on the inner shell.

On the other hand, bearing holes through which the support shafts of the inner shell are inserted are formed in the shutter members that are attached so as to be capable of rotation relative to the inner shell. When the disc cartridge is loaded into the recording/reproduction apparatus or ejected from the recording/reproduction apparatus, the shutter members are rotated relative to the inner shell by rotating the inner shell relative to the lower shell so that the opening in the lower shell is opened and closed by the inner shell and the shutter members. In this disc cartridge, a construction is used where end parts of the support shafts of the inner shell are crimped in a state where the support shafts have been inserted through the bearing holes formed in the shutter members to form expanded-diameter head parts, so that separation of the shutter members from the inner shell is prevented while rotation of the shutter members with respect to the inner shell is still permitted.

By investigating the conventional disc cartridge described above, the present inventors discovered the following problems. With the above disc cartridge, when the shutter members are attached to the inner shell, the expanded-diameter head parts are formed inside concaves formed in the rims of the bearing holes by causing thermal deformation of the end parts of the support shafts on the inner shell using a thermal crimping device or an ultrasonic processing device in a state where the support shafts have been inserted through the bearing holes of the shutter members (i.e., the head parts are formed by a crimping process). Here, when thermal deformation of the end parts of the support shafts is caused by a thermal crimping device, for example, it is necessary to control the temperature of the head molding tip (i.e., the part placed in contact with the end parts of the support shafts during crimping) to a suitable temperature for the crimping process. However, when continuously mass producing disc cartridges, it is difficult to always keep the head molding tip at a constant temperature, and therefore it is difficult to form expanded-diameter head parts of a uniform size.

More specifically, when the temperature of the head molding tip is too low, it is not possible to sufficiently heat the end parts of the support shafts when the head molding tip presses the end parts, so that the end parts do not thermally deform sufficiently and the diameter (size) of the expanded-diameter head parts formed inside the concaves is reduced. In this state, since the support shafts can easily come out of the bearing holes due to a shock caused by the disc cartridge being dropped, for example, the shutter members can easily become detached from the inner shell. On the other hand, when the temperature of the head molding tip is too high, the end parts of the support shafts thermally deform more than necessary when the head molding part forming tip presses the end parts, and although the formed expanded-diameter head parts are large, the thickness of the expanded-diameter head parts becomes too thin. In this state, the expanded-diameter head parts are easily broken, resulting in the shutter members becoming detached from the inner shell. Also, if the temperature of the head molding tip is even higher, when the head molding tip presses the end parts of the support shafts, thermal deformation occurs not only for the support shafts but also for the rims of the bearing holes, resulting in the shutter members being welded to the inner shell. In this state, rotation of the shutter members with respect to the inner shell is obstructed. In this way, in the conventional disc cartridge where the shutter members are attached to the inner shell by a crimping process where thermal deformation is caused using a thermal crimping device or the like (hereinafter simply referred to as "crimping"), it is difficult to keep the amount of thermal deformation suitable and uniform, so that there has been the problem that it is difficult to avoid detachment of the shutter members from the inner shell and poor rotation of the shutter members with respect to the inner shell.

SUMMARY OF THE INVENTION

The present invention was conceived in view of the problems described above and it is a principal object of the present invention to provide a disc cartridge that can avoid detachment and poor rotation of shutter members.

A disc cartridge according to the present invention includes: a cartridge main body that encloses a disc-shaped recording medium and includes a lower shell in which a first opening for disc access is formed and an upper shell; a disc tray which is rotatably disposed inside the cartridge main body and in which a second opening for disc access is formed, the disc tray covering one part of the first opening in a restricted state where disc access is restricted and the second opening being continuous with the first opening in a permitted state where the disc access is permitted so as to open the one part of the first opening; and a shutter member which is axially supported on the disc tray by a first pivoting mechanism disposed on the lower shell and/or the disc tray, which covers another part of the first opening in the restricted state to cover the first opening together with the disc tray, and which opens the other part of the first opening in the permitted state, wherein the lower shell is constructed so that one out of a rotation convex and a rotation guide groove that cause the shutter member to rotate relative to the disc tray in accordance with rotation of the disc tray is formed on the lower shell, the shutter member is constructed so that another out of the rotation convex and the rotation guide groove is formed on the shutter member, the first pivoting mechanism is constructed so that a support shaft that is inserted through a bearing hole formed in one out of the disc tray and the shutter member protrudes on another out of the disc tray and the shutter member, the support shaft is constructed so that a detachment restricting head part formed in an oblong shape where a width in a first direction is wider than a width in a second direction perpendicular to the first direction is formed on an end part of the support shaft, and the bearing hole is formed as a slot through which the detachment restricting head part can be inserted and is formed so that at least while the shutter member is being caused to rotate with respect to the disc tray between a state where the other part is covered and a state where the other part is open, detachment of the shutter member from the disc tray is restricted.

According to the above disc cartridge, the support shaft, on whose end part is formed the detachment restricting head part in an oblong shape where a width in a first direction is wider than a width in a second direction, protrudes on one out of the disc tray and the shutter member. Also, the slot-like bearing hole through which the detachment restricting head part can be inserted is formed in the other out of the disc tray and the shutter member, with the bearing hole restricting detachment (separation) of the shutter member from the disc tray when the shutter member is caused to rotate relative to the disc tray between a state where the shutter member covers the second part of the first opening and a state where the opening is opened. Accordingly, unlike the conventional disc cartridge where the shutter members are fixed to the disc tray (or the inner shell) by a crimping process carried out using a thermal crimping device or the like, it is possible to integrally form the support shaft with the main part of the disc tray (or the shutter member) when the disc tray (or the shutter member) is injection molded. Since the shutter member and the disc tray are not welded when the shutter member is attached to the disc tray, deterioration in the ability of the shutter member to rotate can be reliably avoided. Also, by forming the support shaft during the injection molding, the support shaft can be provided in a protruding state without causing fluctuations in the size and thickness of the detachment restricting head part. This means that it is possible to reliably avoid a state where the detachment restricting head part is too small and can easily come out of the bearing hole and a state where the detachment restricting head part is too thin and can easily break. Accordingly, it is possible to reliably avoid unintentional detachment (separation) of the shutter member from the disc tray.

Another disc cartridge according to the present invention includes: a cartridge main body that encloses a disc-shaped recording medium and includes a lower shell in which a first opening for disc access is formed and an upper shell; a disc tray which is rotatably disposed inside the cartridge main body and in which a second opening for disc access is formed, the disc tray covering one part of the first opening in a restricted state where disc access is restricted and the second opening being continuous with the first opening in a permitted state where the disc access is permitted so as to open the one part of the first opening; and a shutter member which is axially supported on the lower shell by a second pivoting mechanism disposed on the lower shell and/or the disc tray, which covers another part of the first opening in the restricted state to cover the first opening together with the disc tray, and which opens the other part of the first opening in the permitted state, wherein the disc tray is constructed so that one out of a rotation convex and a rotation guide groove that cause the shutter member to rotate relative to the lower shell in accordance with rotation of the disc tray with respect to the cartridge main body is formed on the disc tray, the shutter member is constructed so that another out of the rotation convex and the rotation guide groove is formed on the shutter member, the second pivoting mechanism is constructed so that a support shaft that is inserted through a bearing hole formed in one out of the lower shell and the shutter member protrudes on another out of the lower shell and the shutter member, the support shaft is constructed so that a detachment restricting head part formed in an oblong shape where a width in a first direction is wider than a width in a second direction perpendicular to the first direction is formed on an end part of the support shaft, and the bearing hole is formed as a slot through which the detachment restricting head part can be inserted and is formed so that at least while the shutter member is being caused to rotate with respect to the lower shell between a state where the other part is covered and a state where the other part is open, detachment of the shutter member from the lower shell is restricted.

According to the above disc cartridge, the support shaft, on whose end part is formed the detachment restricting head part in an oblong shape where a width in a first direction is wider than a width in a second direction, protrudes on one of the lower shell and the shutter member. Also, the slot-like bearing hole through which the detachment restricting head part can be inserted is formed in the other out of the lower shell and the shutter member, with the bearing hole restricting detachment (separation) of the shutter member from the lower shell when the shutter member is caused to rotate relative to the lower shell between a state where the shutter member covers the second part of the first opening and a state where the opening is opened. Accordingly, unlike the conventional disc cartridge where the shutter members are fixed to the inner shell (or the disc tray) by a crimping process carried out using a thermal crimping device or the like, it is possible to integrally form the support shaft with the main part of the lower shell (or the shutter member) when the lower shell (or the shutter member) is injection molded. Since the shutter member and the lower shell are not welded when the shutter member is attached to the lower shell, deterioration in the ability of the shutter member to rotate can be reliably avoided. Also, by forming the support shaft during the injection molding, the support shaft can be provided in a protruding state without causing fluctuations in the size and thickness of the detachment restricting head part. This means that it is possible to reliably avoid a state where the detachment restricting head part is too small and can easily come out of the bearing hole and a state where the detachment restricting head part is too thin and can easily break. Accordingly, it is possible to reliably avoid unintentional detachment (separation) of the shutter member from the lower shell.

Also, with either of the disc cartridges described above, the bearing hole may be constructed so that a circular concave, which is deeper than a thickness of the detachment restricting head part and surrounds an insertion through-hole through which the detachment restricting head part can be inserted, is formed in one of the disc tray/the lower shell and the shutter member. With the above construction, the shutter member can be attached to the disc tray or the lower shell without the detachment restricting head part protruding from the rim of the bearing hole.

It should be noted that the disclosure of the present invention relates to a content of Japanese Patent Application 2004-138073 that was filed on 7 May 2004 and the entire content of which is herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of a disc cartridge according to the present invention will now be described with reference to the attached drawings.

First, the construction of a disc cartridge 1 will be described with reference to the drawings.

Figure 1:
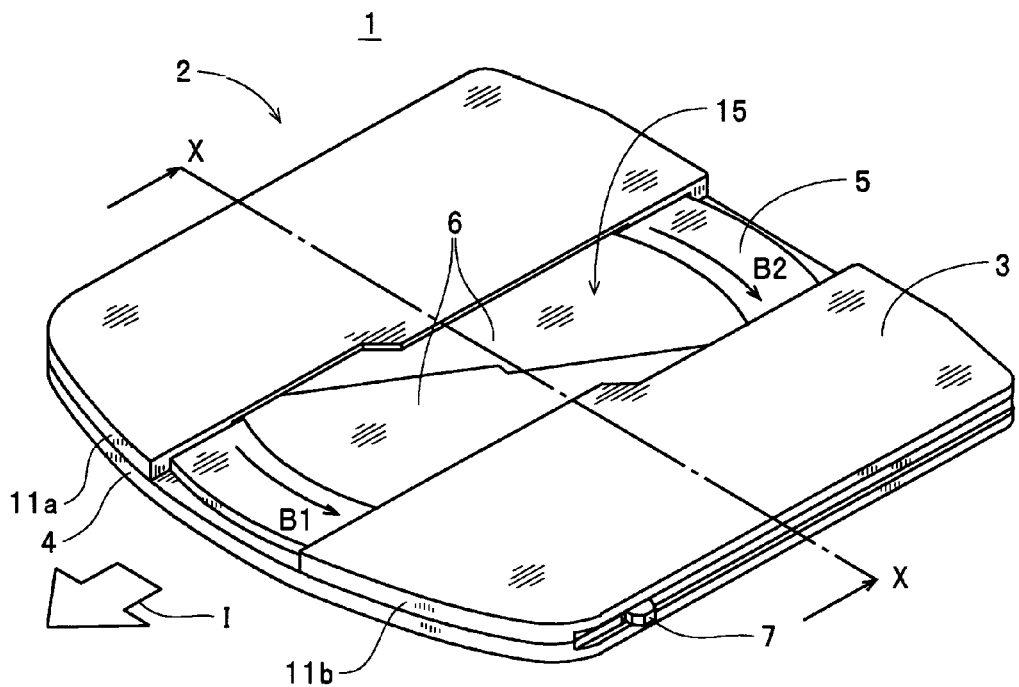
FIG. 1 is an external perspective view of a disc cartridge.
Figure 2:
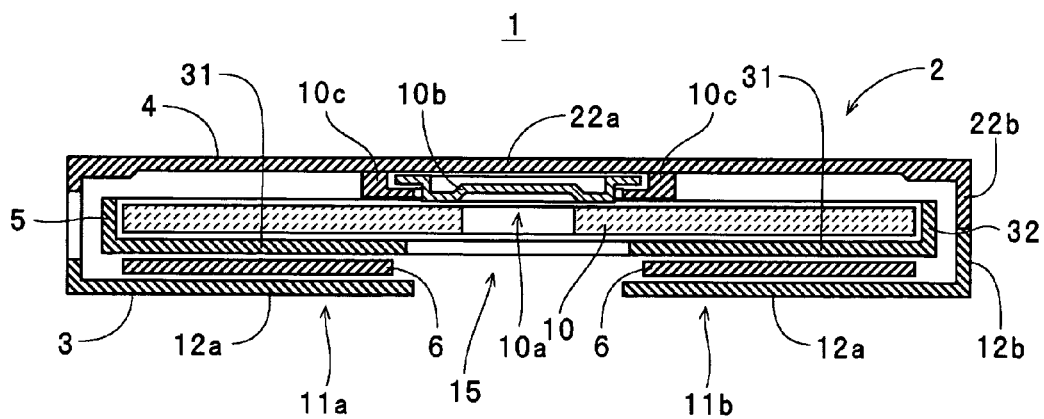
FIG. 2 is a cross-sectional view, taken along a line X-X in FIG. 1, of the disc cartridge in a state where an opening has been opened.

The disc cartridge 1 shown in FIGS. 1 and 2 is a cartridge-type information recording medium constructed so that the recording and reproduction of various kinds of recording data are possible, includes parts such as a cartridge main body 2, a disc tray 5, and a pair of shutter members 6, and is constructed so that an optical disc 10 is enclosed inside the cartridge main body 2. It should be noted that in FIG. 2, the size in the thickness direction has been exaggerated for ease of understanding the present invention. Here, as one example, the optical disc 10 is a single-sided rewritable disc-shaped recording medium and as shown in FIG. 2, a center hole 10a with a diameter of around 15 mm is formed in a center part thereof for clamping in a recording/reproduction apparatus. The optical disc 10 is clamped in the recording/reproduction apparatus by having the recording/reproduction apparatus pull a disc-shaped clamping plate 10b, which is attached to an upper shell 4 of the cartridge main body 2, toward a lower shell 3. On the other hand, as shown in FIGS. 1 and 2, the cartridge main body 2 includes the lower shell 3 and the upper shell 4 that are formed so as to be capable of engaging one another (i.e., capable of being placed on top of one another).

Figure 3:
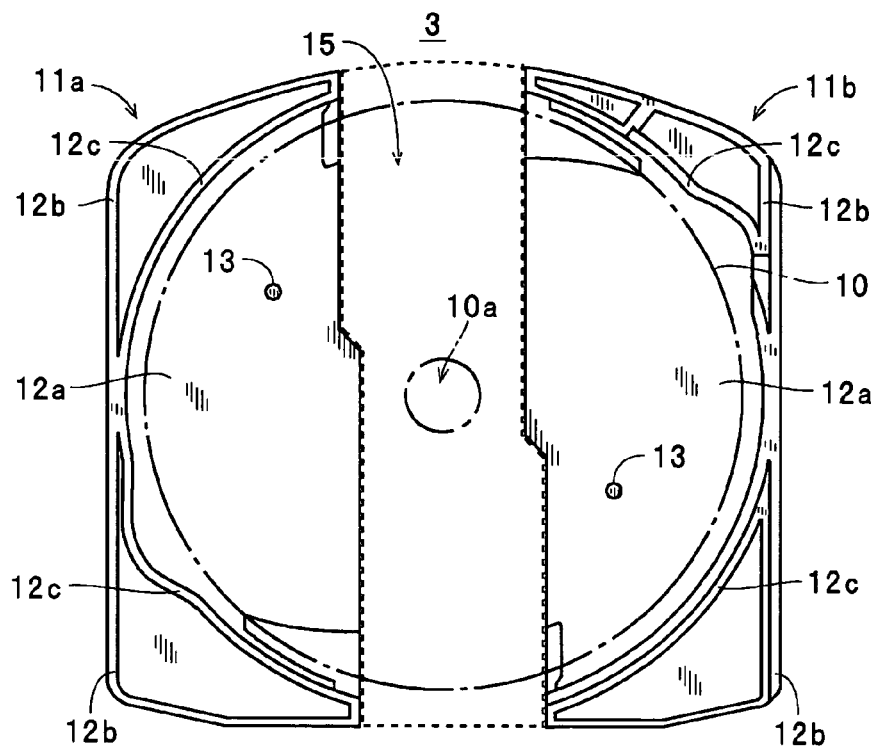
FIG. 3 is a plan view of a lower shell when looking from an inner surface side.

As shown in FIG. 3, the lower shell 3 includes a pair of lower shell main parts 11a, 11b and, as one example, is formed by injection molding polycarbonate (or ABS resin or the like). More specifically, the lower shell 3 (i.e., the lower shell main parts 11a, 11b) includes base plates 12a, side plates 12b that are erected on the outer edges of the base plates 12a and construct side surface parts of the cartridge main body 2, and partition walls 12c that form a disc enclosure inside the cartridge main body 2. The lower shell 3 is constructed so that in a state where the lower shell 3 has engaged the upper shell 4 (i.e., in a state where the lower shell 3 has been placed on the upper shell 4 and integrated), a disc-access opening 15 is formed between the respective base plates 12a of the lower shell main parts 11a, 11b. In this case, the opening 15 corresponds to a "first opening" for the present invention, with the opening width, the opening length, and the like of the opening 15 being set so that during the recording and reproduction of recording data, disc access (i.e., clamping by the recording/reproduction apparatus, irradiation with a laser beam using an optical head, and the like) is possible for the optical disc 10 inside the cartridge main body 2.

More specifically, as shown in FIG. 3, the opening 15 is formed so as to extend in a belt-like form from one outer edge (an upper edge in FIG. 3) of the lower shell 3 across the center part to the other outer edge (a lower edge in FIG. 3). By doing so, the opening 15 has a form and size that can expose a belt-like region of the optical disc 10 enclosed inside the cartridge main body 2, the region including opposite outer edge regions that face one another with a central region including a periphery of the center hole 10a in between. With this construction, the disc cartridge 1 makes it possible to carry out the recording and reproduction of recording data on the optical disc 10 using two optical heads simultaneously. Also, rotation convexes (hereinafter, simply referred to as "convexes") 13 that are inserted into slits 52 (see FIG. 10) in the shutter member 6 and as described later cause the shutter member 6 to slide in accordance with rotation of the disc tray 5 are respectively erected on the respective base plates 12a of both lower shell main parts 11a, 11b.

Figure 4:
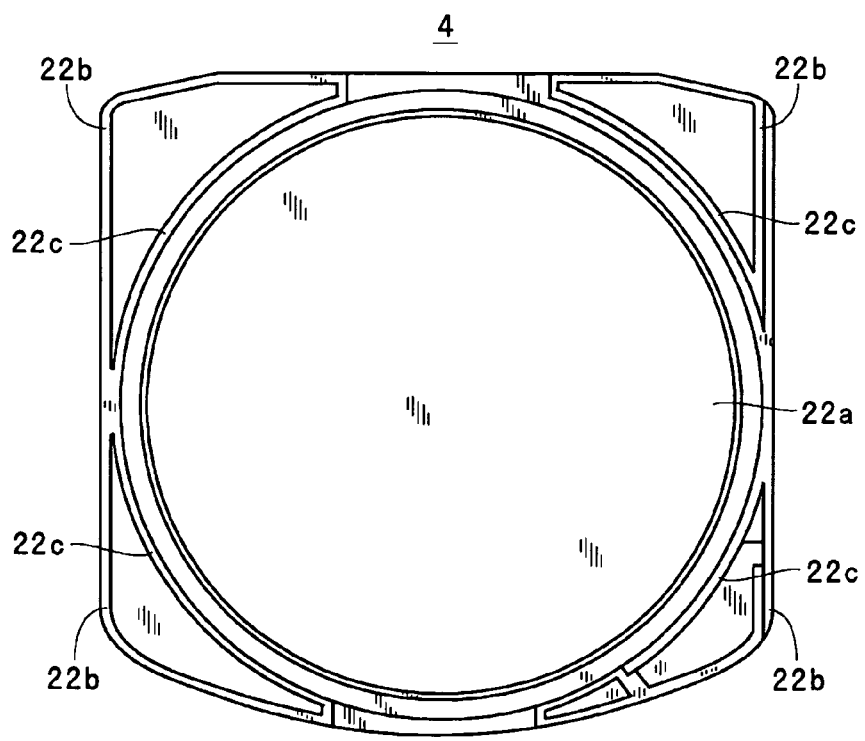
FIG. 4 is a plan view of an upper shell when looking from an inner surface side.

As shown in FIG. 4, the upper shell 4 includes a top plate 22a, side walls 22b that are erected at outer edges of the top plate 22a and together with the side walls 12b of the lower shell 3 construct the side wall parts of the cartridge main body 2, and partition walls 22c that together with the partition walls 12c of the lower shell 3 form the disc enclosure inside the cartridge main body 2. As one example, the upper shell 4 is constructed by injection molding transparent polycarbonate. Also, as shown in FIG. 2, the clamping plate 10b is attached to a center part of the upper shell 4 by a ring-like attaching member 10c. In this case, the clamping plate 10b is attached so as to be rotatable with respect to the upper shell 4 and slightly movable in a direction toward and away from the top plate 22a.

Figure 5:
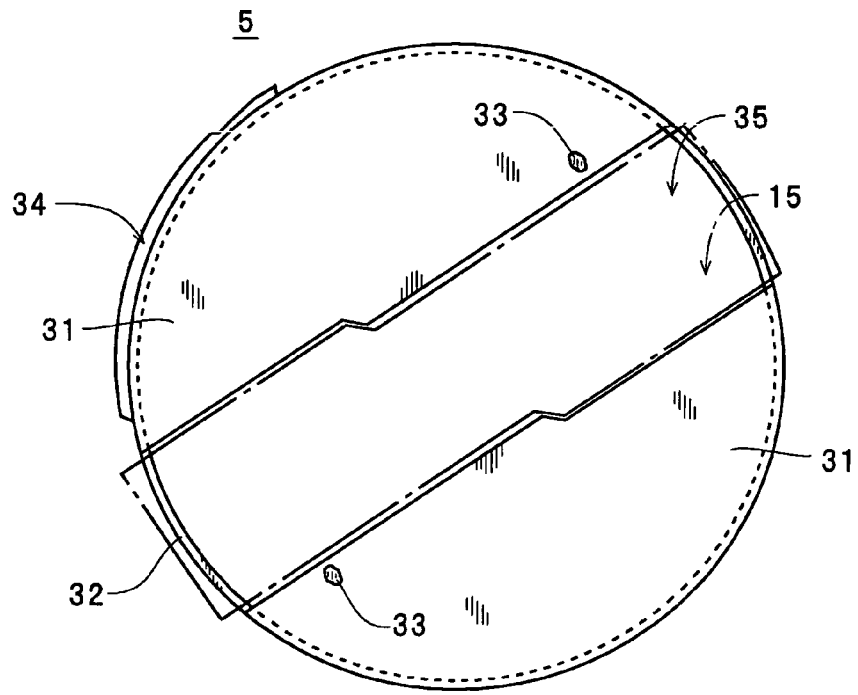
FIG. 5 is a plan view of a disc tray when looking from a lower shell side.

As shown in FIG. 5, the disc tray 5 includes a disc-shaped base plate 31 in which an opening 35 is formed and a side wall 32 that is erected at an outer edge of the base plate 31 and therefore is formed as a shallow plate on which the optical disc 10 can be mounted. As shown in FIG. 2, the disc tray 5 is enclosed so as to be rotatable inside the cartridge main body 2 together with the optical disc 10. In this case, the opening 35 corresponds to a "second opening" for the present invention and, as shown in FIG. 5, is formed with substantially the same width as the width of the opening 15 in the lower shell 3. It should be noted that in FIG. 5, the rim of the opening 15 is shown by a dot-dash line. Engaging teeth 34 (the individual engaging teeth 34 have not been illustrated in FIG. 5) that can engage a shutter opening/closing means (not shown) of the recording/reproduction apparatus are also formed in the side wall 32. In addition, a cutaway part that enables a lock member 7 (see FIG. 1) to engage the disc tray 5 in a normal state where disc access to the optical disc 10 is restricted and thereby restrict rotation of the disc tray 5 with respect to the cartridge main body 2 and a cutaway part (not shown) that enables the shutter opening/closing means of the recording/reproduction apparatus to rotate the disc tray 5 are formed in the side wall 32.

Figure 6:
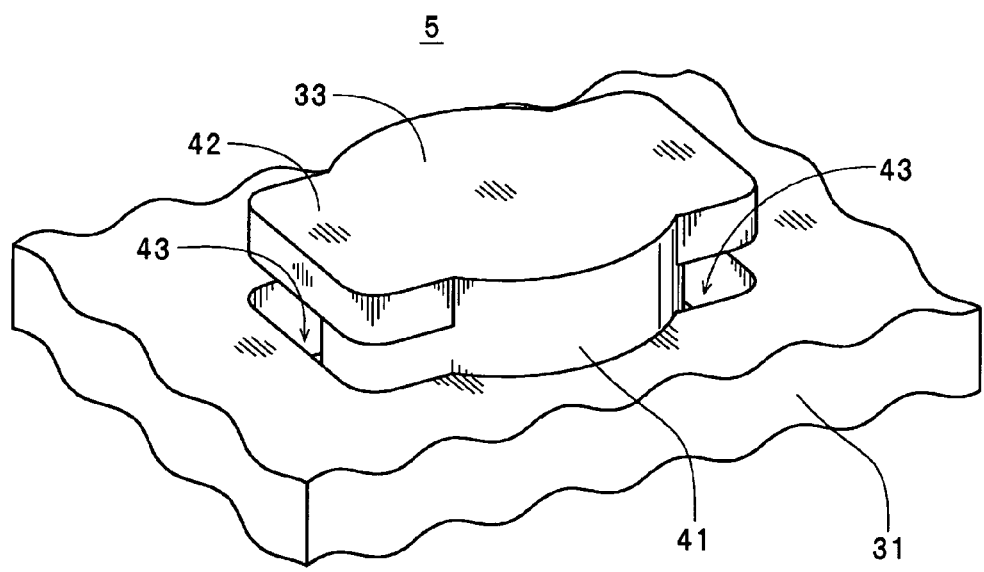
FIG. 6 is an external perspective view of a support shaft that protrudes on the disc tray and a periphery of the support shaft.
Figure 7:
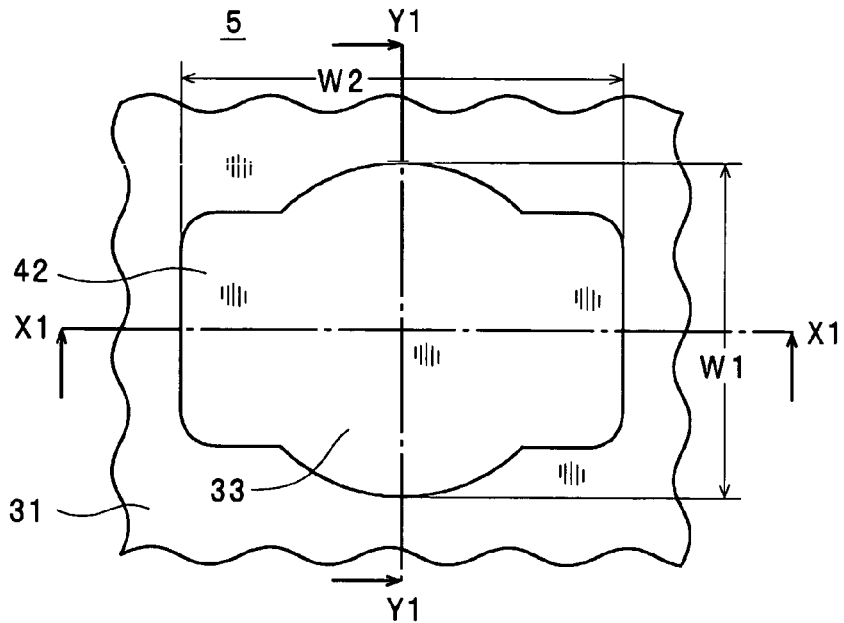
FIG. 7 is a plan view of a support shaft on the disc tray and the periphery of the support shaft.
Figure 8:
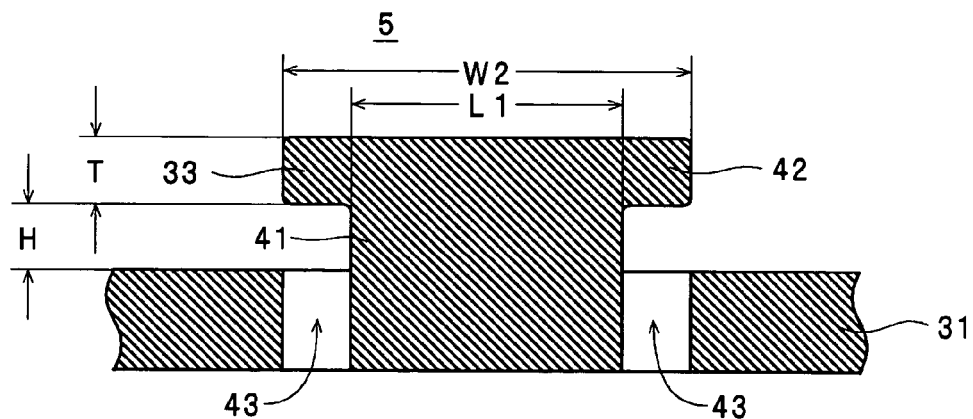
FIG. 8 is a cross-sectional view taken along the line X1-X1 in FIG. 7.
Figure 9:
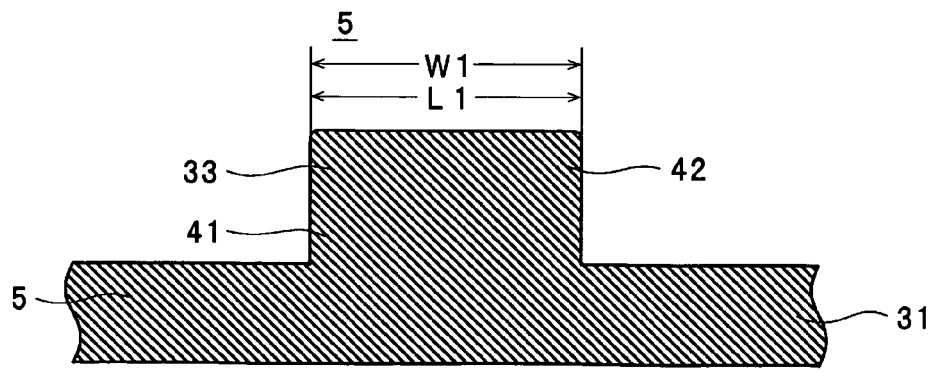
FIG. 9 is a cross-sectional view taken along the line Y1-Y1 in FIG. 7.

In addition, support shafts 33 for supporting the shutter member 6 are erected on a lower surface (the closest surface in FIG. 5) of the base plate 31. In this case, together with bearing holes 51 of the shutter member 6 described later, the support shafts 33 construct a "first pivoting mechanism" for the present invention, with the support shafts 33 being integrally molded on the base plate 31 when the disc tray 5 is injection molded. In this case, as shown in FIG. 6, the support shafts 33 are formed so as to include shaft main parts 41 that are erected on the base plate 31 and detachment restricting head parts (hereinafter also referred to as "head parts") 42 formed on the end parts (the upper ends in FIG. 6) of the shaft main parts 41. Also, as shown in FIG. 7, the head parts 42 are integrally formed with the shaft main parts 41 so as to be oblong-shaped when viewed from above, and as shown in FIGS. 7 to 9, are formed so that a width W1 of shorter sides (the "width in the first direction" for the present invention) is around 3 mm and a width W2 of longer sides (the "width in the second direction" for the present invention: a width in a direction perpendicular to the width W1) is around 3.9 mm. Also, as shown in FIG. 8, the head parts 42 are formed so that at around 0.5 mm, the thickness T is around the same as a protruding height H by which the shaft main parts 41 protrude from the surface of the base plate 31. On the other hand, as shown in FIGS. 8 and 9, the shaft main parts 41 are formed so that at 3 mm, the diameter L1 is around the same as the width W1 of the shorter sides of the head parts 42. In this case, as shown in FIGS. 6 and 8, holes 43 for removal from the mold for forming the head parts 42 are formed in the base plate 31 of the disc tray 5.

Figure 10:
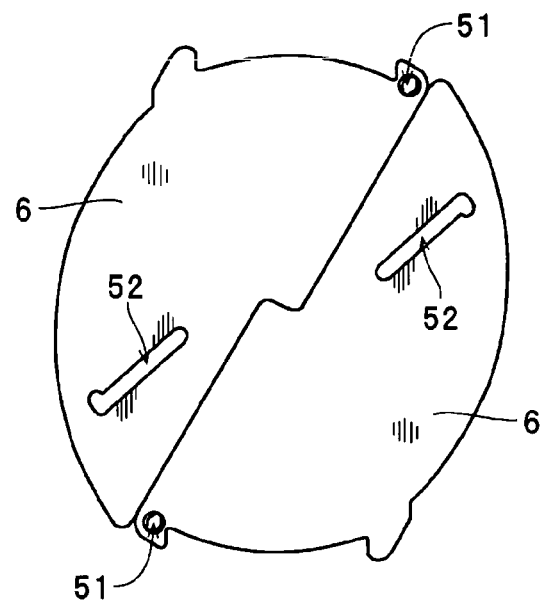
FIG. 10 is a plan view of two shutter members looking from the lower shell side.
Figure 11:
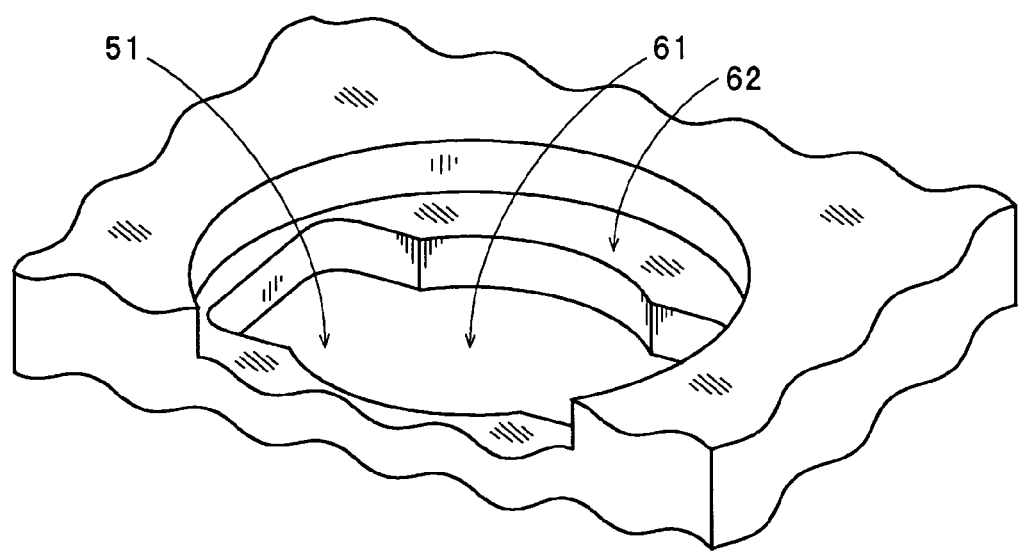
FIG. 11 is an external perspective view of a bearing hole formed in the illustrated shutter members and a periphery of the bearing hole.
Figure 12:
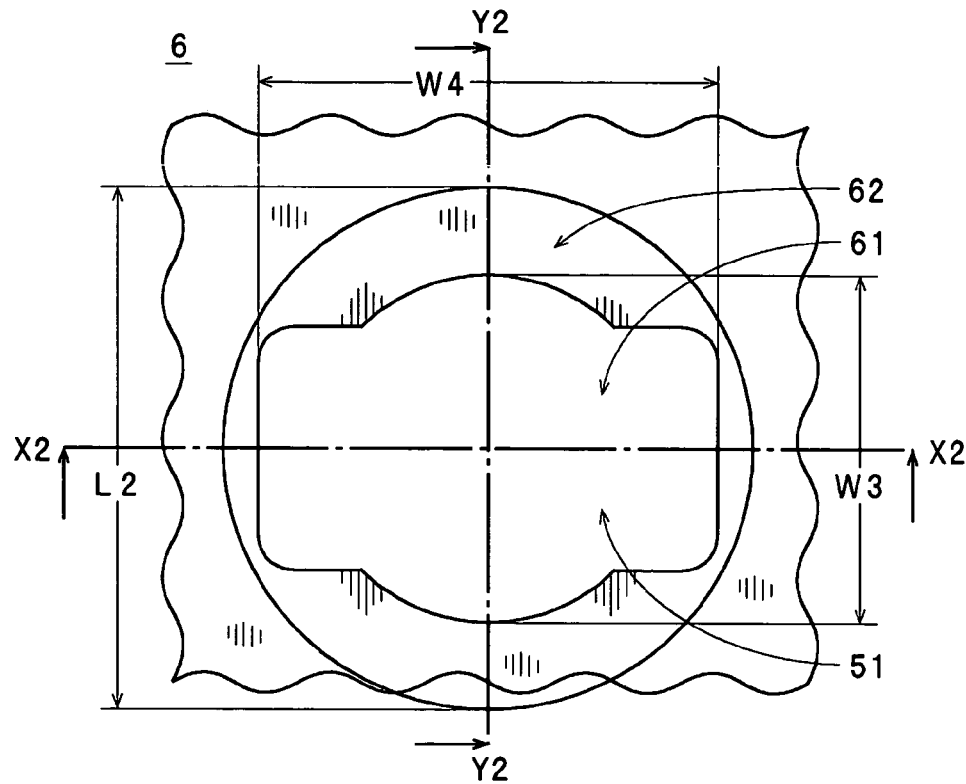
FIG. 12 is a plan view of the periphery of a bearing hole in a shutter member.
Figure 13:
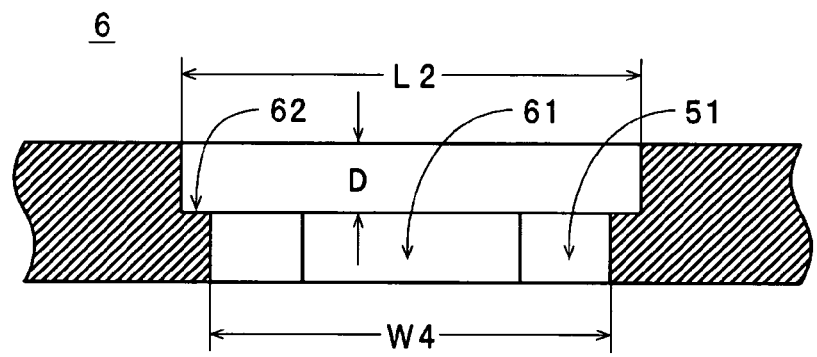
FIG. 13 is a cross-sectional view taken along the line X2-X2 in FIG. 12.
Figure 14:
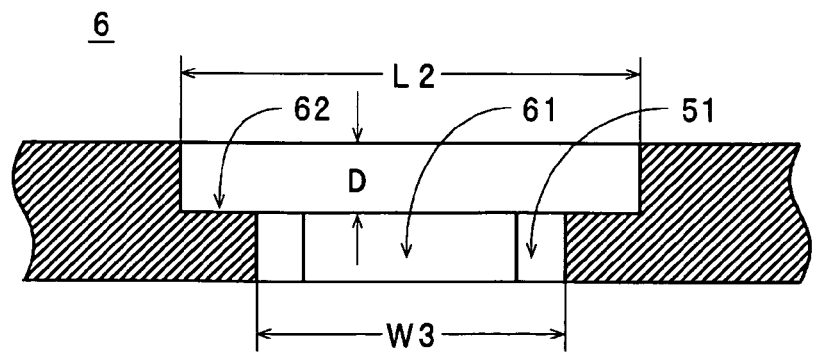
FIG. 14 is a cross-sectional view taken along the line Y2-Y2 in FIG. 12.

As shown in FIG. 10, the bearing holes 51 through which the support shafts 33 of the disc tray 5 can be inserted are formed at first ends of the respective shutter members 6 and the slits 52 ("rotation guide channels" for the present invention) through which the convexes 13 of the lower shell 3 can be inserted are formed at other ends of the respective shutter members 6. As shown in FIG. 11, the bearing holes 51 are each constructed by forming a slot-like insertion through-hole 61 with a complementary shape to the head parts 42 of the support shafts 33 and a circular concave 62 formed so as to surround the insertion through-hole 61 so that the insertion through-hole 61 and the circular concave 62 pass through the shutter member 6 in the thickness direction. In this case, as shown in FIGS. 12 to 14, the insertion through-holes 61 are formed so that a width (opening width) W3 of shorter sides is around 3.2 mm and a width (opening width) W4 of longer sides (a width in a direction perpendicular to the width W3) is around 4.1 mm, so that the opening widths of the corresponding parts are slightly bigger than the widths W1, W2 of the head parts 42. By doing so, when the shutter members 6 are attached to the disc tray 5, it is possible to pass the head parts 42 of the support shafts 33 through the insertion through-holes 61.

Figure 19:
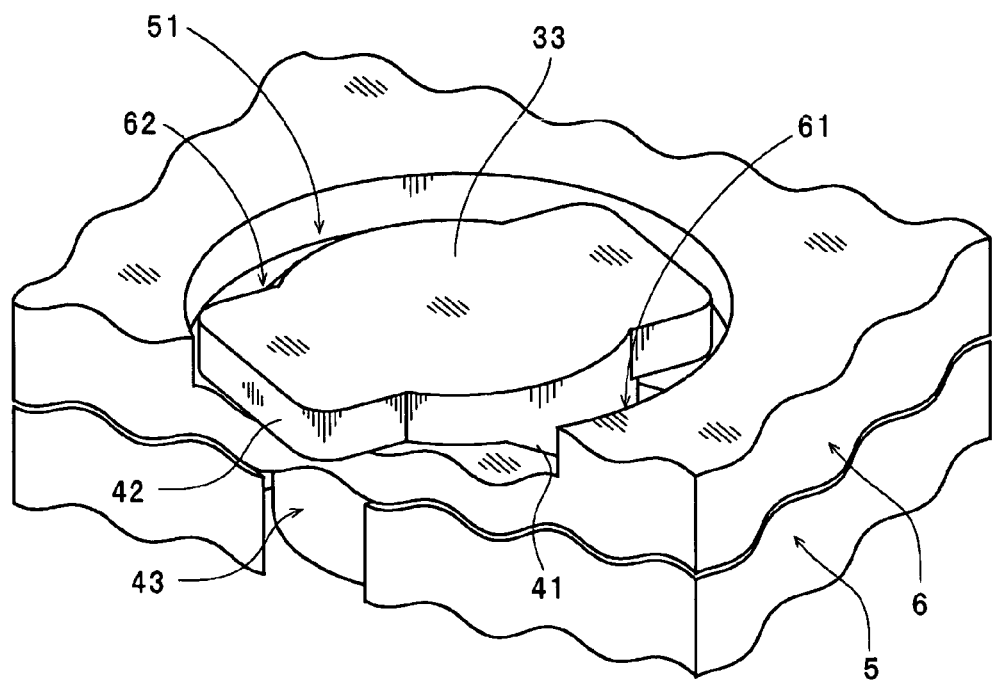
FIG. 19 is an external perspective view showing the positional relationship between a support shaft of the disc tray and a bearing hole of a shutter member in the state shown in FIG. 17.

On the other hand, as shown in FIGS. 13 and 14, the circular concaves 62 are formed so that at around 0.5 mm, the depth D is around the same as the thickness T of the head parts 42, while the diameter L2 is around 4.5 mm. By doing so, as shown in FIG. 19, the head parts 42 are prevented from protruding out from the surfaces of the shutter members 6 when the head parts 42 have been inserted through the insertion through-holes 61 and relative rotation of the head parts 42 inside the circular concaves 62 (i.e., rotation of the support shafts 33 that accompanies rotation of the shutter member 6 with respect to the disc tray 5) is permitted. As described later, in a state where the shutter member 6 is axially supported so as to be rotatable with respect to the disc tray 5 due to the support shafts 33 having been inserted through the bearing holes 51, the shutter member 6 is enclosed inside the cartridge main body 2 so as to be sandwiched between the lower shell 3 and the disc tray 5, as shown in FIG. 2.

Next, the method of assembling and the method of using the disc cartridge 1 will be described with reference to the drawings.

Figure 15:
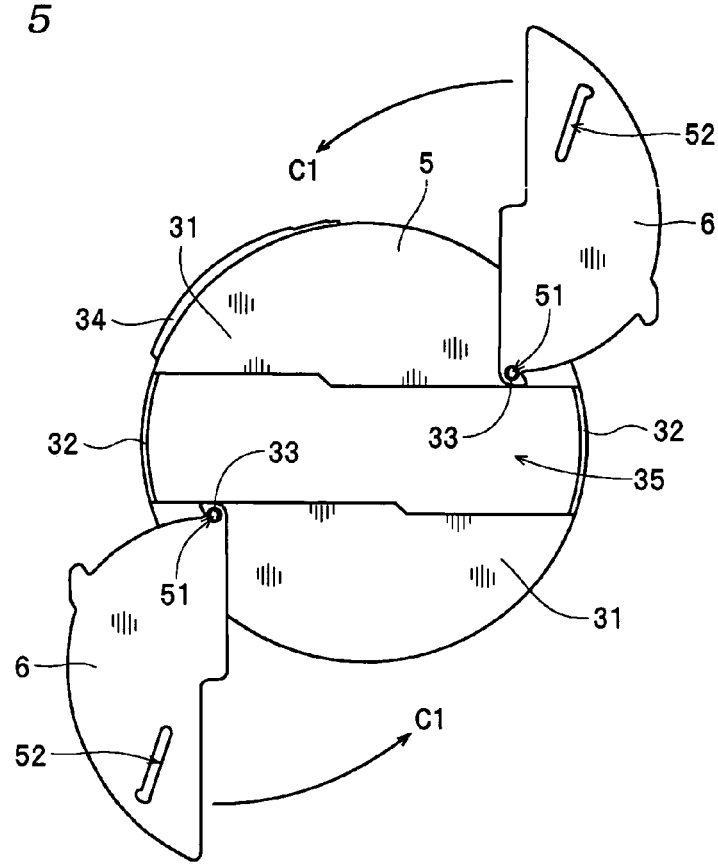
FIG. 15 is a plan view of a state where the respective shutter members have been attached to the disc tray.
Figure 16:
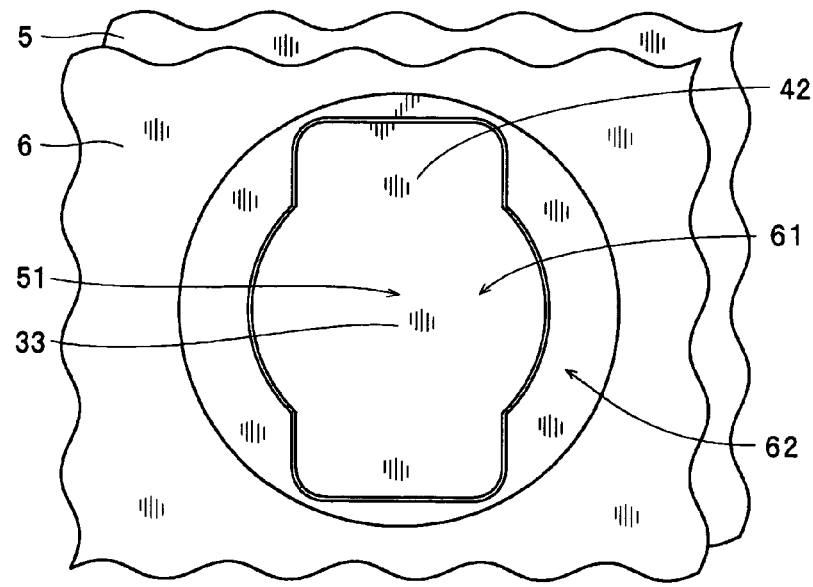
FIG. 16 is a plan view showing the positional relationship between a support shaft on the disc tray and a bearing hole in a shutter member in the state shown in FIG. 15.
Figure 17:
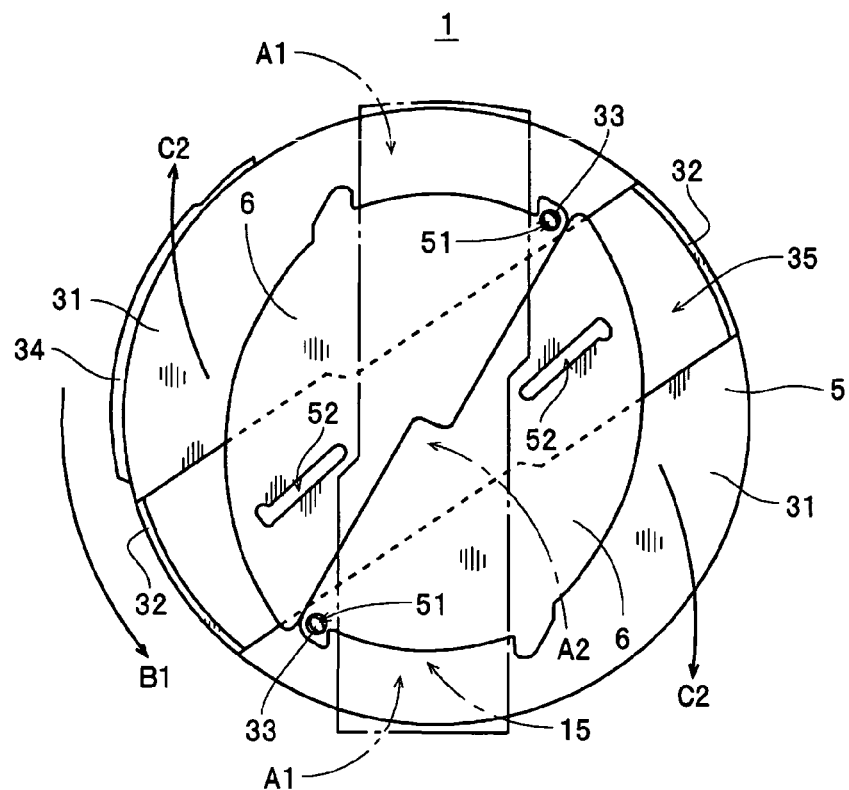
FIG. 17 is a plan view of a state where the opening has been completely covered by the disc tray and the shutter members.
Figure 18:
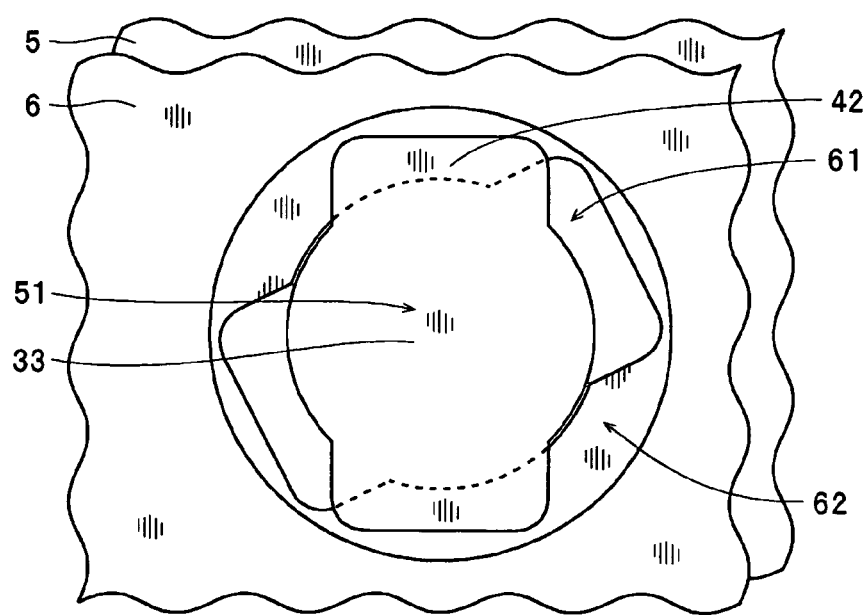
FIG. 18 is a plan view showing the positional relationship between a support shaft of the disc tray and a bearing hole of a shutter member in the state shown in FIG. 17.

When the disc cartridge 1 is assembled, as shown in FIG. 15, first the shutter members 6 are attached to the disc tray 5. When doing so, as shown in FIG. 16, after the head parts 42 of the support shafts 33 of the disc tray 5 have been inserted through the insertion through-holes 61 of the bearing holes 51 in the shutter members 6, the shutter members 6 are rotated with respect to the disc tray 5 in the direction of the arrows C1 shown in FIG. 15. By doing so, as shown in FIG. 17, the attachment of the shutter members 6 to the disc tray 5 is complete. In this case, in the disc cartridge 1, after the head parts 42 have been inserted through the insertion through-holes 61, by rotating the shutter members 6 with respect to the disc tray 5, as shown in FIGS. 18 and 19, the head parts 42 engage rims of the insertion through-holes 61 (i.e., base parts of the circular concaves 62) to restrict detachment of the shutter members 6 from the disc tray 5. Accordingly, the shutter members 6 can be attached to the disc tray 5 with no crimping process using a thermal crimping apparatus or the like being required. After this, in a state where the optical disc 10 has been mounted on the disc tray 5 for which the attachment of the shutter members 6 has been completed, the disc tray 5 is enclosed within the cartridge main body 2 so as to be sandwiched between the lower shell 3 and the upper shell 4. At this time, the convexes 13 of the lower shell 3 (the lower shell main parts 11a, 11b) are inserted into the slits 52 of the shutter members 6, and the upper shell 4 is placed on and fixed to the lower shell 3. By doing so, as shown in FIGS. 1 and 2, the disc cartridge 1 is completed.

As shown in FIG. 1, when the disc cartridge 1 is ejected from the recording/reproduction apparatus, the opening 15 of the lower shell 3 is covered by the disc tray 5 and the shutter members 6 so that disc access to the optical disc 10 inside the cartridge main body 2 is restricted (a "restricted state" for the present invention). More specifically, as shown in FIG. 17, the end regions A1 (open positions for exposing the outer periphery of the optical disc 10: "one part" for the present invention) at both ends of the opening 15 in the longitudinal direction are covered by the base plates 31 of the disc tray 5 and the central region A2 (an open position for exposing the periphery of the center hole 10a of the optical disc 10: "another part" for the present invention) in a center of the opening 15 in the longitudinal direction is covered by the shutter members 6. As a result, the entire region of the opening 15 is covered by the disc tray 5 and the shutter members 6. It should be noted that in FIG. 17 and in FIG. 20 that is referred to later, for ease of understanding the covered state (opened state) of the opening 15, the lower shell 3, the upper shell 4, and the like have been omitted and only the disc tray 5 and the shutter members 6 are illustrated, with the rim of the opening 15 being shown by the dot-dash line. At this time, in the disc cartridge 1, in the state where the entire region of the opening 15 is covered by the disc tray 5 and the shutter members 6, as shown in FIGS. 18 and 19, the head parts 42 of the support shafts 33 on the disc tray 5 engage the rims of the insertion through-holes 61 (i.e., the base parts of the circular concaves 62) of the bearing holes 51 in the shutter member 6 and a state where detachment (separation) of the shutter members 6 from the disc tray 5 is restricted is maintained.

On the other hand, when the disc cartridge 1 is loaded into a recording/reproduction apparatus, the disc cartridge 1 is pulled inside the apparatus by the recording/reproduction apparatus in the direction of the arrow I shown in FIG. 1. It should be noted that although a state where the lower shell 3 faces upward is shown in FIG. 1, during actual use, the disc cartridge 1 is loaded into the recording/reproduction apparatus in a state where the upper shell 4 faces upward. At this time, as the disc tray 5 is rotated by the shutter opening/closing means of the recording/reproduction apparatus, the shutter members 6 are caused to rotate with respect to the disc tray 5. By doing so, the opening 15 is opened and disc access to the optical disc 10 inside the cartridge main body 2 is permitted (a "permitted state" for the present invention). More specifically, first by having the shutter opening/closing means of the recording/reproduction apparatus contact the lock member 7, the lock member 7 is rotated with respect to the cartridge main body 2, thereby removing the restriction on rotation of the disc tray 5. Next, when the disc cartridge 1 is pulled further into the recording/reproducing apparatus, the shutter opening/closing means engages the engaging teeth 34 of the disc tray 5, and by pulling the disc cartridge 1 in this state further into the recording/reproducing apparatus, the disc tray 5 is rotated with respect to the cartridge main body 2 in the direction of the arrow B1 shown in FIG. 17. In this case, as the disc tray 5 rotates, the convexes 13 of the lower shell 3 slide inside and relative to the slits 52 of the shutter members 6, resulting in the shutter members 6 being caused to rotate (slide) with respect to the disc tray 5 in the direction of the arrows C2 about the bearing holes 51 (the support shafts 33 of the disc tray 5).

Figure 20:
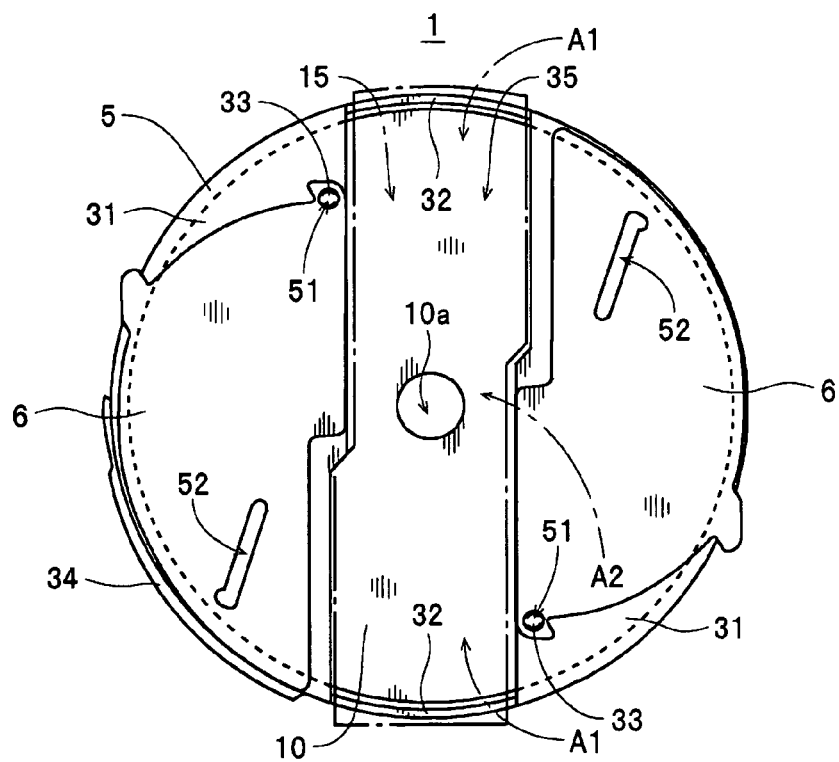
FIG. 20 is a plan view of a state where the entire region of the opening has been opened due to the disc tray and the shutter members having been withdrawn.
Figure 21:
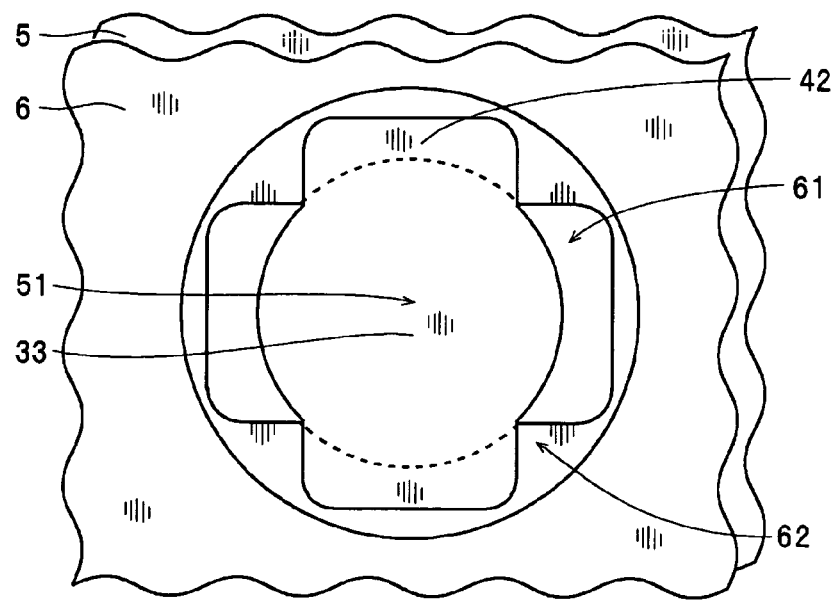
FIG. 21 is a plan view showing the positional relationship between a support shaft of the disc tray and a bearing hole of a shutter member in the state shown in FIG. 20.

Next, when the disc cartridge 1 has been pulled still further into the recording/reproducing apparatus, as shown in FIG. 20, the opening 15 of the lower shell 3 and the opening 35 of the disc tray 5 are placed in a coinciding state (the openings are made continuous) in the thickness direction of the disc cartridge 1 and the shutter members 6 are withdrawn from above the opening 35. By doing so, the end regions A1 of the opening 15 that were covered by the disc tray 5 and the center region A2 of the opening 15 that was covered by the shutter members 6 are opened to expose the optical disc 10 inside the cartridge main body 2, thereby permitting disc access to the optical disc 10 from outside the cartridge main body 2. Here, in a state where the disc tray 5 and the shutter members 6 have been removed from above the opening 15 (a state where the opening 15 has been completely opened), as shown in FIG. 21, the head parts 42 of the support shafts 33 on the disc tray 5 engage the rims of the insertion through-holes 61 (i.e., the base parts of the circular concaves 62) of the bearing holes 51 in the shutter members 6 so that the state where detachment (separation) of the shutter members 6 from the disc tray 5 is restricted is maintained. After this, the clamping plate 10b is magnetically pulled by the recording/reproducing apparatus so that the rim (the central region) of the center hole 10a is clamped, and irradiation with a laser beam (the recording and reproduction of recording data) is then carried out via the opening 15.

On the other hand, when the disc cartridge 1 for which the recording and reproduction of recording data has been completed is ejected from the recording/reproducing apparatus, the disc tray 5 is rotated by the shutter opening/closing means of the recording/reproducing apparatus in the direction of the arrow B2 shown in FIG. 1, with such rotation also causing the shutter members 6 to rotate so that as shown in FIG. 17, the opening 15 is completely covered by the disc tray 5 and the shutter members 6. By doing so, the optical disc 10 inside the cartridge main body 2 is protected by the cartridge main body 2, the disc tray 5, and the shutter members 6. In this case, with the disc cartridge 1, when the shutter members 6 are rotated with respect to the disc tray 5 in a range from the state shown in FIG. 21 (the state of the disc tray 5 and the shutter members 6 in the state where the opening 15 is completely open) to the state shown in FIG. 18 (the state of the disc tray 5 and the shutter members 6 in the state where the opening 15 is completely covered), the head parts 42 of the support shafts 33 are maintained in a state of engagement with the rims of the insertion through-holes 61 (i.e., the base parts of the circular concaves 62) of the bearing holes 51. Accordingly, the state where detachment (separation) of the shutter members 6 from the disc tray 5 is restricted is maintained while the shutter members 6 rotate with respect to the disc tray 5.

In this way, with the disc cartridge 1, the support shafts 33, where oblong head parts 42, for which the first width W2 is wider than the second width W1, are formed on the ends of the shaft main parts 41, are formed so as to protrude from the disc tray 5. Also, the slot-like bearing holes 51 that allow the head parts 42 to pass through are formed in the shutter members 6, the bearing holes 51 (the insertion through-holes 61) restricting detachment (separation) of the shutter members 6 from the disc tray 5 when the shutter members 6 rotate relative to the disc tray 5 between a state where the shutter members 6 close the central region A2 of the opening 15 and a state where the opening 15 is opened. Accordingly, unlike the conventional disc cartridge where the shutter members are fixed to the disc tray (or the inner shell) by a crimping process carried out using a thermal crimping device or the like, it is possible to integrally form the support shafts 33 with the main part of the disc tray 5 when the disc tray 5 is injection molded. Since the shutter members 6 and the disc tray 5 are not welded when the shutter members 6 are attached to the disc tray 5, deterioration in the ability of the shutter members 6 to rotate can be reliably avoided. Also, by forming the support shafts 33 during the injection molding, the support shafts 33 can be provided in a protruding state without causing fluctuations in the size and thickness of the head parts 42. This means that it is possible to reliably avoid a state where the head parts 42 are too small and can easily come out of the bearing holes 51 and a state where the head parts 42 are too thin and can easily break. Accordingly, it is possible to reliably avoid unintentional detachment (separation) of the shutter members 6 from the disc tray 5.

In this case, by constructing the bearing holes 51 by forming, in the shutter members 6, the circular concaves 62 with a deeper depth D than the thickness T of the head parts 42 so as to surround the insertion through-holes 61 through which the head parts 42 can be inserted, the shutter members 6 can be attached to the disc tray 5 without the head parts 42 protruding from the surface of the shutter members 6.

Figure 22:
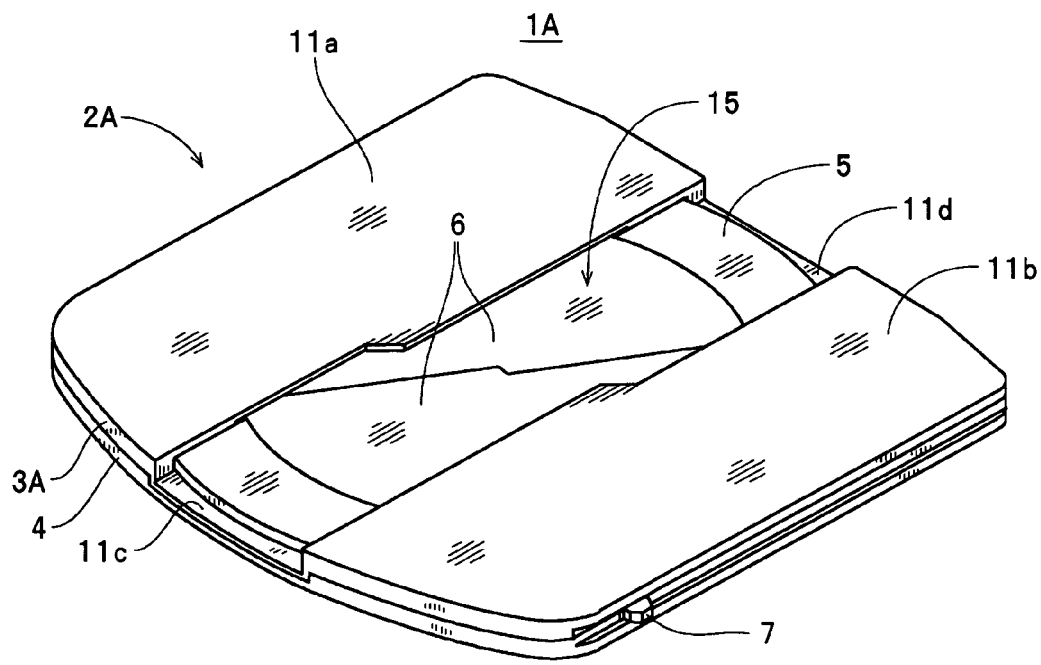
FIG. 22 is an external perspective view of another disc cartridge.

It should be noted that the present invention is not limited to the above embodiment. For example, the disc-shaped recording medium for the present invention is not limited to the rewritable optical disc 10 described above, and the concept of a "recording medium" also includes various kinds of optical discs such as read-only type optical discs and recordable optical discs, as well as magneto-optical discs, magnetic discs, and the like. Also, although in the disc cartridge 1 described above, the cartridge main body 2 is constructed of the lower shell 3 including the separate lower shell main parts 11a, 11b, the present invention is not limited to this and for example, like a disc cartridge 1A shown in FIG. 22, in place of the lower shell 3 of the disc cartridge 1, a cartridge main body 2A may be constructed using a lower shell 3A, where the lower shell main parts 11a, 11b are integrally linked by linking parts 11c, 11d. Also, the opening shape of the opening for disc access for the present invention is not limited to a rectangular shape whose longest sides are in a front-rear direction for the cartridge main body 2 as in the example described above, and a rectangular opening shape whose longest sides are in a left-right direction for the cartridge main body or a rectangular opening shape whose longest sides are in a diagonal direction for the cartridge main body may be used. In this case, the disc cartridge according to the present invention is not limited to a cartridge for which recording and reproduction are possible using two optical heads simultaneously and also includes a cartridge, such as a disc cartridge 1B shown in FIG. 23, constructed so as to include a cartridge main body 2B with a lower shell 3B in which an opening 15b that allows recording and reproduction using a single optical head is formed.

Also, although a construction where the support shafts 33 protrude on the disc tray 5, the bearing holes 51 are formed in the shutter members 6, and the shutter members 6 are rotatably attached to the disc tray 5 is used in the disc cartridge 1 described above, the present invention is not limited to this and it is possible to use a construction where the support shafts 33 protrude on the shutter members 6, the bearing holes 51 are formed in the disc tray 5, and the shutter members 6 are rotatably attached to the disc tray 5. In addition, although a construction where the convexes 13 protrude on the lower shell 3, the slits 52 are formed in the shutter members 6, and the shutter members 6 are caused to rotate in accordance with rotation of the disc tray 5 is used in the disc cartridge 1 described above, the present invention is not limited to this and it is possible to use a construction where the rotation convexes (the convexes 13) protrude on the shutter members 6, the rotation guide grooves (the slits 52) are formed in the lower shell 3, and the shutter members 6 are caused to rotate in accordance with rotation of the disc tray 5. Also, the form of the detachment restricting head parts for the present invention in plan view and the opening shapes of the bearing holes (the insertion through-holes) are not limited to the shapes of the head parts 42 and the insertion through-holes 61 of the disc cartridge 1, and it is possible to modify the shapes as appropriate so long as the shapes are oblong with a first width that is wider than a second width.

Figure 23:
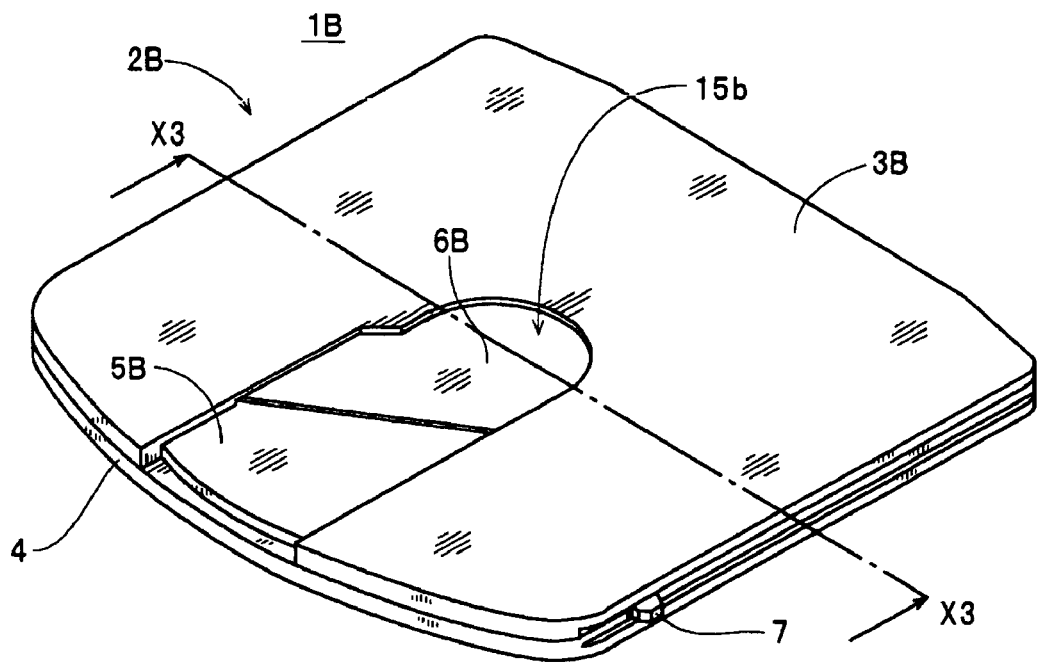
FIG. 23 is an external perspective view of yet another disc cartridge.
Figure 24:
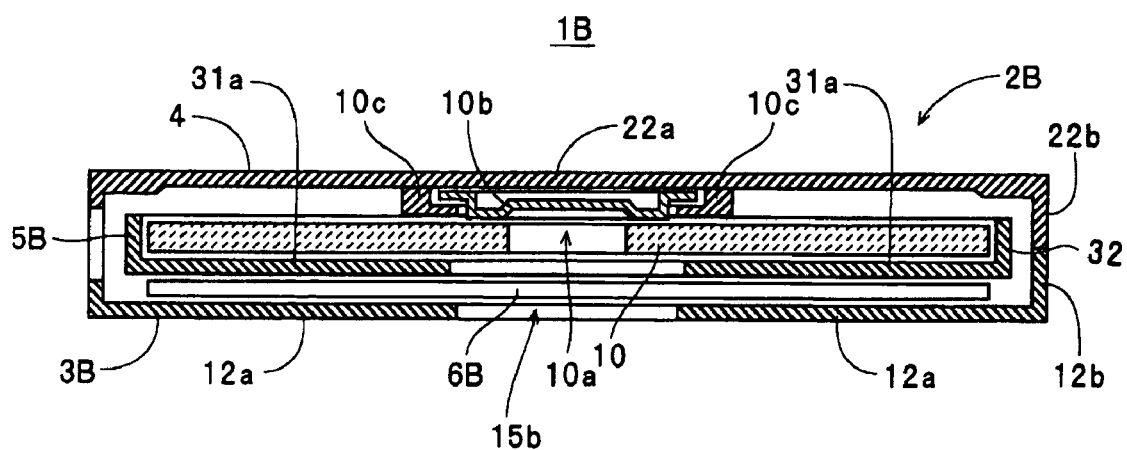
FIG. 24 is a cross-sectional view, taken along the line X3-X3 in FIG. 23, of the yet another disc cartridge in the state where the opening has been opened.
Figure 25:
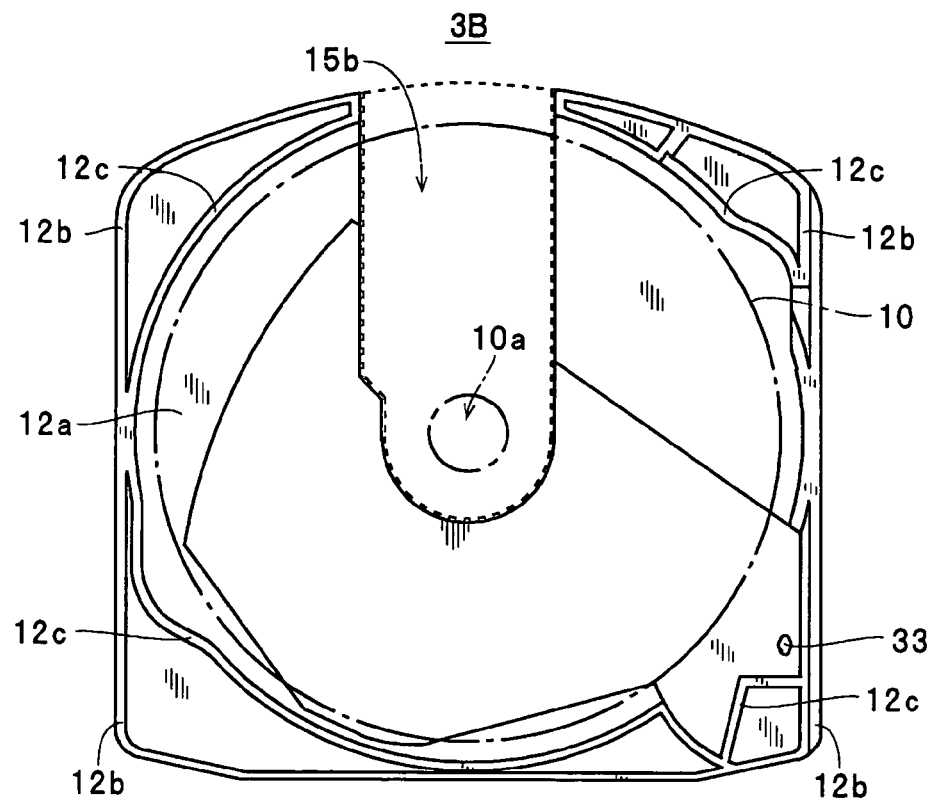
FIG. 25 is a plan view of a lower shell when looking from an inner surface side.
Figure 26:
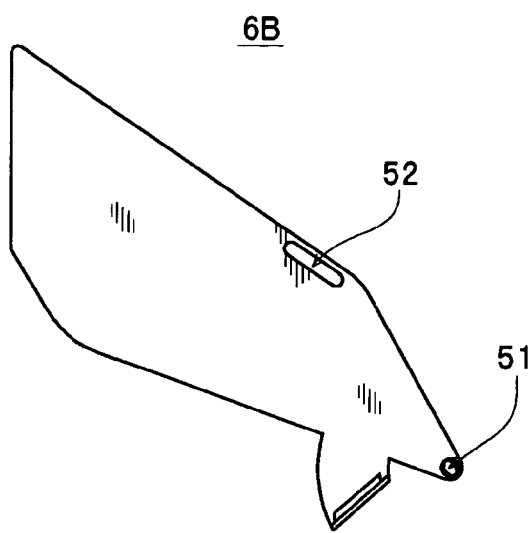
FIG. 26 is a plan view of a shutter member when looking from an upper shell side.
Figure 27:
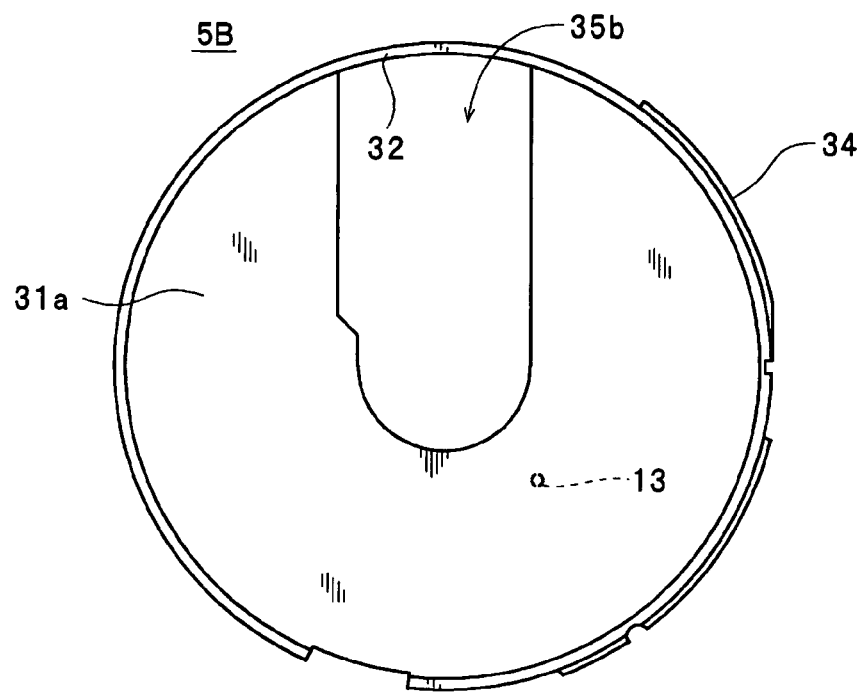
FIG. 27 is a plan view of a disc tray when looking from an upper shell side.

In addition, although a construction where the opening 15 is covered by the pair of shutter members 6 and the disc tray 5 is used in the disc cartridge 1 described above, the present invention is not limited to this and it is also possible to use a construction, like the disc cartridge 1B shown in FIGS. 23 and 24, where an opening 15b is opened and covered by a single shutter member 6B and a disc tray 5B. In this case, although a construction where the support shafts 33 protrude on the disc tray 5, the bearing holes 51 are formed in the shutter members 6, and the shutter members 6 are rotatably attached to the disc tray 5 is used in the disc cartridge 1 described above, as shown in FIG. 25, the disc cartridge 1B uses a construction where a support shaft 33 protrudes on the lower shell 3B, a bearing hole 51 is formed in the shutter member 6B, and the shutter member 6B is rotatably attached to the lower shell 3B. In this example, the support shaft 33 and the bearing hole 51 together construct a "second pivoting mechanism" for the present invention. Also, although a construction where the convexes 13 protrude on the lower shell 3, the slits 52 are formed in the shutter members 6, and the shutter members 6 are caused to rotate in accordance with rotation of the disc tray 5 is used in the disc cartridge 1 described above, in the disc cartridge 1B, a construction is used where a convex 13 protrudes on the disc tray 5B as shown in FIG. 27, a slit 52 is formed in the shutter member 6B as shown in FIG. 26, and the shutter member 6B is caused to rotate in accordance with rotation of the disc tray 5B. In this case, an opening 35b (another example of the "second opening" for the present invention) is formed in a base plate 31a of the disc tray 5B with substantially the same width as the width of the opening 15b (another example of the "first opening" for the present invention) of the lower shell 3B.

Figure 28:
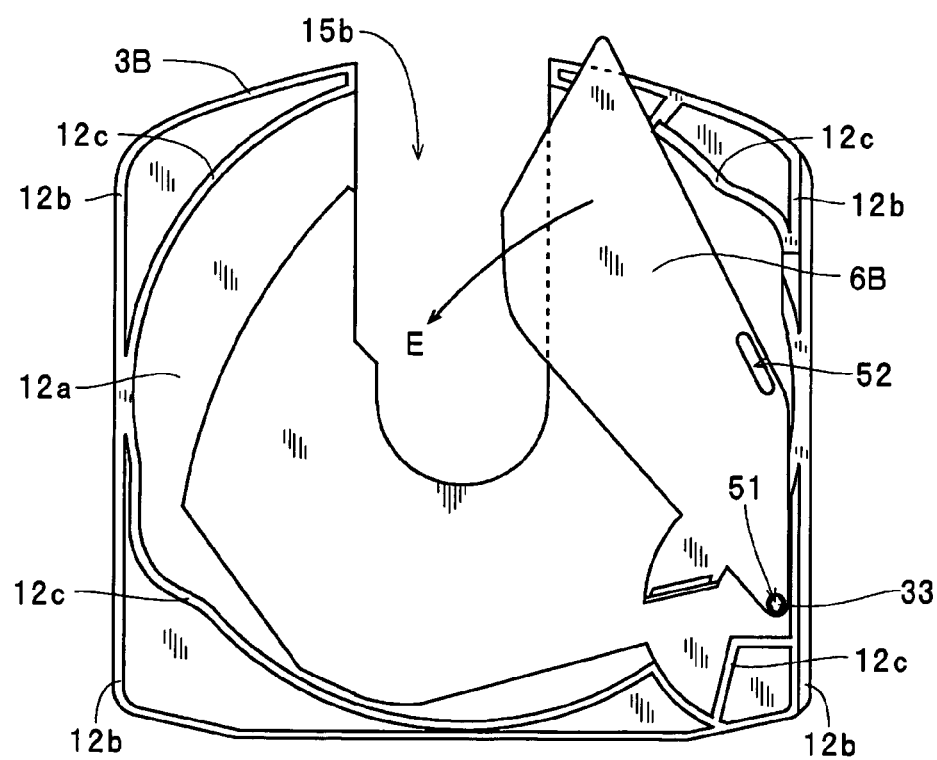
FIG. 28 is a plan view of a state where the shutter member has been attached to the lower shell.

When the disc cartridge 1B is assembled, as shown in FIG. 28, first shutter member 6B is attached to the lower shell 3B. At this time, after the support shaft 33 of the lower shell 3B has been inserted through the bearing hole 51 of the shutter member 6B, the shutter member 6B is rotated with respect to the lower shell 3B in the direction of the arrow E. By doing so, the attachment of the shutter member 6B to the lower shell 3B is completed. In this case, the disc cartridge 1B is constructed so that the head part 42 engages the rim of the insertion through-hole 61 (i.e., the base part of the circular concave 62) so that detachment (separation) of the shutter member 6B from the lower shell 3B is restricted. Accordingly, it is possible to attach the shutter member 6B to the lower shell 3B without requiring a crimping process that uses a thermal crimping device or the like. After this, in a state where the disc tray 5B on which the optical disc 10 has been mounted is disposed on the lower shell 3B for which the attachment of the shutter member 6B is complete, the lower shell 3B is fixed to the upper shell 4. By doing so, the disc cartridge 1B is completed.

Figure 29:
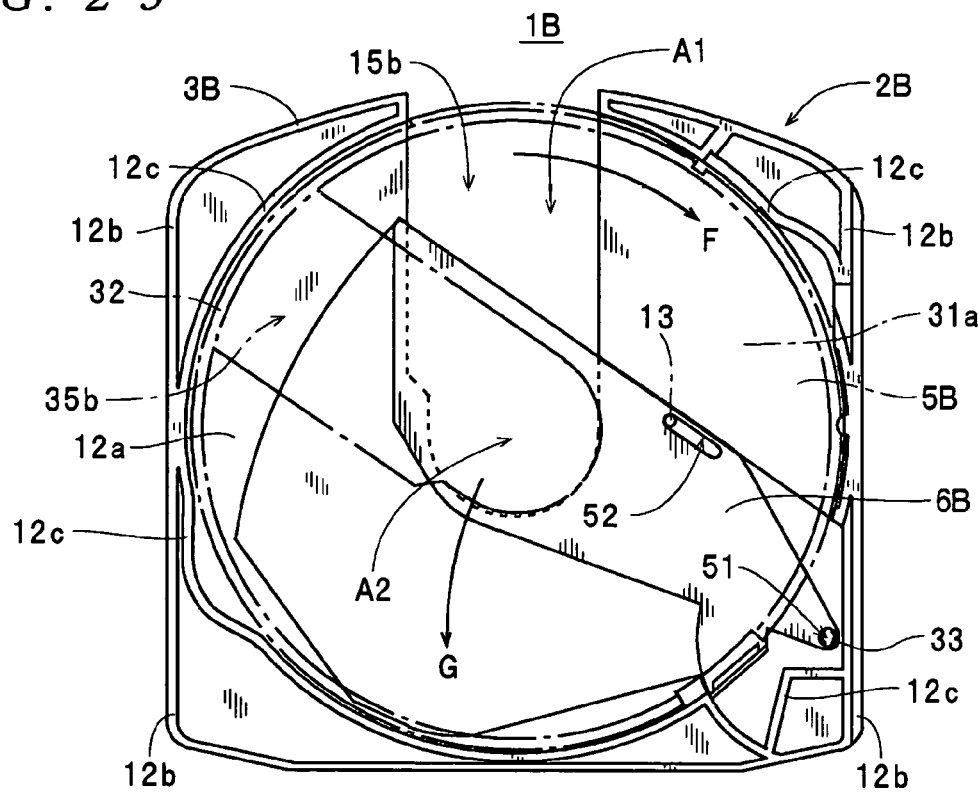
FIG. 29 is a plan view of a state where the opening has been completely covered by the disc tray and the shutter member.

When the disc cartridge 1B has been ejected from a recording/reproducing apparatus, the opening 15b of the lower shell 3B is covered by the disc tray 5B and the shutter member 6B so that disc access to the optical disc 10 inside the cartridge main body 2B is restricted (the "restricted state" for the present invention). More specifically, as shown in FIG. 29, an end region A1 at one end of the opening 15b (an open position for exposing the outer edge part of the optical disc 10: "one part" for the present invention) is covered by the base plate 31a of the disc tray 5B and a central region A2 at the other end of the opening 15b (an open position for exposing the periphery of the center hole 10a of the optical disc 10: "another part" for the present invention) is covered by the shutter member 6B. By doing so, disc access to the optical disc 10 is restricted. It should be noted that in FIG. 29 and in FIG. 30 that is referred to later, for ease of understanding the covered state (or the opened state) of the opening 15b, parts such as the upper shell 4 have been omitted and only the lower shell 3B and the shutter member 6B have been shown, with the disc tray 5B being shown by the dot-dash line. In this case, according to the disc cartridge 1B, when the opening 15b is completely covered by the disc tray 5B and the shutter member 6B, the head part 42 of the support shaft 33 in the lower shell 3B engages the rim of the insertion through-hole 61 (i.e., the base part of the circular concave 62) in the bearing hole 51 in the shutter member 6B, thereby maintaining the state where detachment (separation) of the shutter member 6B from the lower shell 3B is restricted.

On the other hand, when the disc cartridge 1B is loaded into a recording/reproducing apparatus, as the disc tray 5B is rotated by the shutter opening/closing means of the recording/reproducing apparatus, the shutter member 6B is caused to rotate with respect to the lower shell 3B. By doing so, the opening 15b is opened and disc access to the optical disc 10 inside the cartridge main body 2B is permitted (the "permitted state" for the present invention). More specifically, first, in a state where the shutter opening/closing means of the recording/reproducing apparatus has engaged the engaging teeth 34 of the disc tray 5B, the disc cartridge 1B is pulled in further so that the disc tray 5B is caused to rotate with respect to the cartridge main body 2B in the direction shown by the arrow F in FIG. 29. At this time, as the disc tray 5B rotates, the convex 13 of the disc tray 5B slides inside and relative to the slit 52 of the shutter member 6B, resulting in the shutter member 6B being caused to rotate (slide) relative to the lower shell 3B about the center of the bearing hole 51 (the support shaft 33 of the lower shell 3B) in the direction shown by the arrow G.

Figure 30:
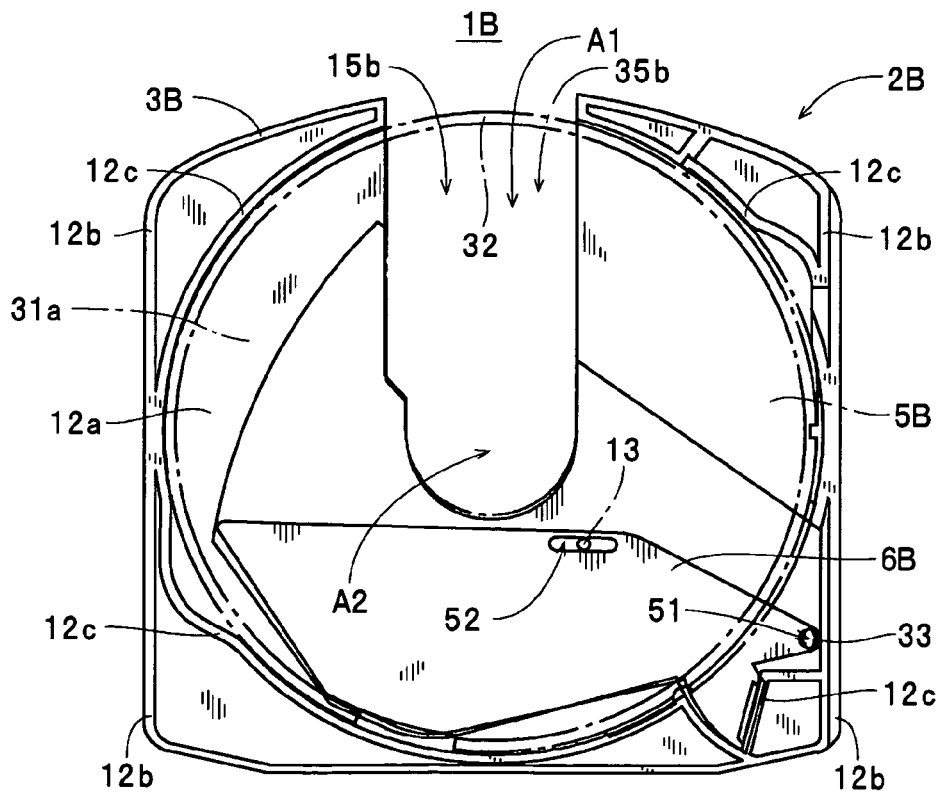
FIG. 30 is a plan view of a state where the entire region of the opening has been opened due to the disc tray and the shutter member having been withdrawn.

Next, when the disc cartridge 1B has been pulled yet further into the recording/reproducing apparatus, as shown in FIG. 30, the opening 15b of the lower shell 3B and the opening 35b of the disc tray 5B are placed in a coinciding state (i.e., the openings are made continuous) in the thickness direction of the disc cartridge 1B and the shutter member 6B is withdrawn from above the opening 15b. By doing so, the end region A1 of the opening 15b was covered by the disc tray 5B and the central region A2 of the opening 15b that was covered by the shutter member 6B are opened and disc access to the optical disc 10 from outside the cartridge main body 2B is permitted. At this time, in the disc cartridge 1B, in a state where the disc tray 5B and the shutter member 6B have been withdrawn from the opening 15b (a state where the opening 15b has been completely opened), the head part 42 of the support shaft 33 on the lower shell 3B engages the rim of the insertion through-hole 61 (the base part of the circular concave 62) of the bearing hole 51 in the shutter member 6B, thereby maintaining the state where detachment (separation) of the shutter member 6B from the lower shell 3B is restricted. After this, the rim of the center hole 10a (the central region) of the optical disc 10 is clamped by the recording/reproducing apparatus and irradiation of the optical disc 10 with a laser beam (i.e., the recording and reproduction of recording data) is then carried out via the opening 15b.

In this way, with the disc cartridge 1B, the support shaft 33, on whose end is formed the oblong head part 42 for which the first width is wider than the second width, is formed so as to protrude from the lower shell 3B. Also, the slot-like bearing hole 51 (the insertion through-hole 61) that allows the head part 42 to pass through is formed in the shutter member 6B, the bearing hole 51 restricting detachment (separation) of the shutter member 6B from the lower shell 3B when the shutter member 6B rotates relative to the lower shell 3B between a state where the shutter member 6B covers the central region A2 of the opening 15b and a state where the central region A2 is opened. Accordingly, unlike the conventional disc cartridge where the shutter member is fixed to the disc tray (or the inner shell) by a crimping process carried out using a thermal crimping device or the like, it is possible to integrally form the support shaft 33 with the main part of the lower shell 3B when the lower shell 3B is injection molded. Since the shutter member 6B and the lower shell 3B are not welded when the shutter member 6B is attached to the lower shell 3B, deterioration in the ability of the shutter member 6B to rotate can be reliably avoided. Also, by forming the support shaft 33 during the injection molding, the support shaft 33 can be provided in a protruding state without causing fluctuations in the size and thickness of the head part 42. This means that it is possible to reliably avoid a state where the head part 42 is too small and can easily come out of the bearing hole 51 and a state where the head part 42 is too thin and can easily break. Accordingly, it is possible to reliably avoid unintentional detachment (separation) of the shutter member 6B from the lower shell 3B.

Also, although a construction where the support shaft 33 protrudes on the lower shell 3B, the bearing hole 51 is formed in the shutter member 6B, and the shutter member 6B is rotatably attached to the lower shell 3B is used in the disc cartridge 1B described above, the present invention is not limited to this and it is possible to use a construction where the support shaft 33 protrudes on the shutter member 6B, the bearing hole 51 is formed in the lower shell 3B, and the shutter member 6B is rotatably attached to the lower shell 3B. In addition, although a construction where the convex 13 protrudes on the disc tray 5B, the slit 52 is formed in the shutter member 6B, and the shutter member 6B is rotated in accordance with rotation of the disc tray 5B is used in the disc cartridge 1 described above, the present invention is not limited to this and it is possible to use a construction where the rotation convex (the convex 13) protrudes on the shutter member 6B, the rotation guide groove (the slit 52) is formed in the disc tray 5B, and the shutter member 6B is rotated in accordance with rotation of the disc tray 5B.

What is claimed is:

1. A disc cartridge comprising:
a cartridge main body that encloses a disc-shaped recording medium and includes a lower shell in which a first opening for disc access is formed and an upper shell;
a disc tray which is rotatably disposed inside the cartridge main body and in which a second opening for disc access is formed, the disc tray covering one part of the first opening in a restricted state where disc access is restricted and the second opening being continuous with the first opening in a permitted state where the disc access is permitted so as to open the one part of the first opening; and
a shutter member which is axially supported on the disc tray by a first pivoting mechanism disposed on the lower shell and/or the disc tray, which covers another part of the first opening in the restricted state to cover the first opening together with the disc tray, and which opens the other part of the first opening in the permitted state,
wherein the lower shell is constructed so that one out of a rotation convex and a rotation guide groove that cause the shutter member to rotate relative to the disc tray in accordance with rotation of the disc tray is formed on the lower shell,
the shutter member is constructed so that another out of the rotation convex and the rotation guide groove is formed on the shutter member,
the first pivoting mechanism is constructed so that a support shaft that is inserted through a bearing hole formed in one out of the disc tray and the shutter member protrudes on another out of the disc tray and the shutter member,
the support shaft is constructed so that a detachment restricting head part formed in an oblong shape where a width in a first direction is wider than a width in a second direction perpendicular to the first direction is formed on an end part of the support shaft, and
the bearing hole is formed as a slot through which the detachment restricting head part can be inserted and is formed so that at least while the shutter member is being caused to rotate with respect to the disc tray between a state where the other part is covered and a state where the other part is open, detachment of the shutter member from the disc tray is restricted.

2. A disc cartridge comprising:
a cartridge main body that encloses a disc-shaped recording medium and includes a lower shell in which a first opening for disc access is formed and an upper shell;
a disc tray which is rotatably disposed inside the cartridge main body and in which a second opening for disc access is formed, the disc tray covering one part of the first opening in a restricted state where disc access is restricted and the second opening being continuous with the first opening in a permitted state where the disc access is permitted so as to open the one part of the first opening; and
a shutter member which is axially supported on the lower shell by a pivoting mechanism disposed on the lower shell and/or the disc tray, which covers another part of the first opening in the restricted state to cover the first opening together with the disc tray, and which opens the other part of the first opening in the permitted state,
wherein the disc tray is constructed so that one out of a rotation convex and a rotation guide groove that cause the shutter member to rotate relative to the lower shell in accordance with rotation of the disc tray with respect to the cartridge main body is formed on the disc tray,
the shutter member is constructed so that another out of the rotation convex and the rotation guide groove is formed on the shutter member,
the pivoting mechanism is constructed so that a support shaft that is inserted through a bearing hole formed in one out of the lower shell and the shutter member protrudes on another out of the lower shell and the shutter member,
the support shaft is constructed so that a detachment restricting head part formed in an oblong shape where a width in a first direction is wider than a width in a second direction perpendicular to the first direction is formed on an end part of the support shaft, and
the bearing hole is formed as a slot through which the detachment restricting head part can be inserted and is formed so that at least while the shutter member is being caused to rotate with respect to the lower shell between a state where the other part is covered and a state where the other part is open, detachment of the shutter member from the lower shell is restricted.

3. A disc cartridge according to claim 1,
wherein the bearing hole is constructed so that a circular concave, which is deeper than a thickness of the detachment restricting head part and surrounds an insertion through-hole through which the detachment restricting head part can be inserted, is formed in one of the disc tray and the shutter member.

4. A disc cartridge according to claim 2,
wherein the bearing hole is constructed so that a circular concave, which is deeper than a thickness of the detachment restricting head part and surrounds an insertion through-hole through which the detachment restricting head part can be inserted, is formed in one of the lower shell and the shuffer member.

* * * * *

UNITED STATES PATENT AND TRADEMARK OFFICE
CERTIFICATE OF CORRECTION

PATENT NO.         : 7,343,613 B2                                          Page 1 of 1
APPLICATION NO. : 11/119892
DATED              : March 11, 2008
INVENTOR(S)        : Hashizume et al.

It is certified that error appears in the above-identified patent and that said Letters Patent is hereby corrected as shown below:

At column 16, line 57, (claim 4, line 7) of the printed patent, "shuffer" should be --shutter--.

Signed and Sealed this

Nineteenth Day of August, 2008

JON W. DUDAS
*Director of the United States Patent and Trademark Office*